(No Model.)

F. HAMMOND.
BICYCLE BRAKE.

No. 598,866. Patented Feb. 8, 1898.

Witnesses
W. Acitz
G. E. Peene

Inventor.
Frank Hammond
By W. Bruce
Att'y

UNITED STATES PATENT OFFICE.

FRANK HAMMOND, OF PARIS, CANADA.

BICYCLE-BRAKE.

SPECIFICATION forming part of Letters Patent No. 598,866, dated February 8, 1898.

Application filed June 1, 1894. Renewed November 30, 1897. Serial No. 660,288. (No model.)

*To all whom it may concern:*

Be it known that I, FRANK HAMMOND, a citizen of the Dominion of Canada, residing in Paris, in the county of Brant, in the Province of Ontario, Canada, have invented certain new and useful Improvements in Bicycle-Brakes; and I do hereby declare that the following is a full, clear, and exact description of the construction and operation of the same.
Reference is made to the accompanying drawings, in which—

Figure 1:
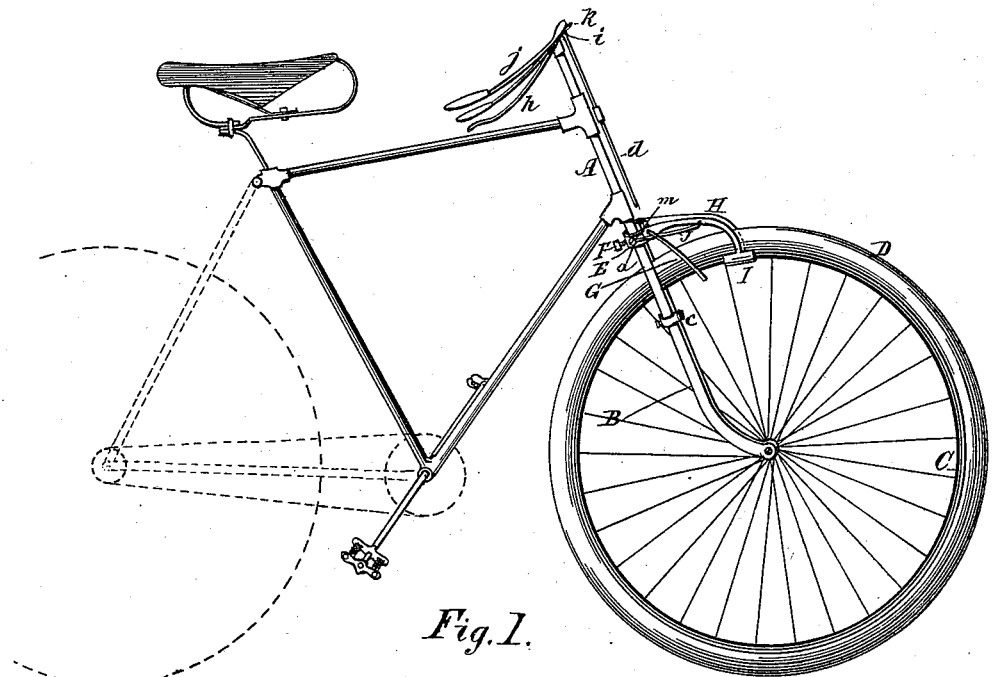
Figure 2:
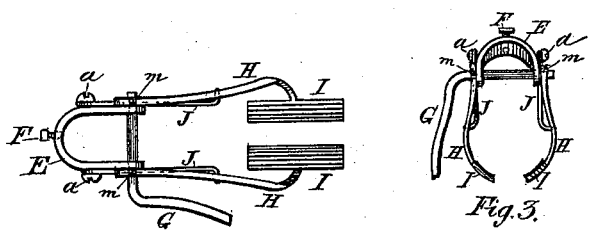
Figure 3:
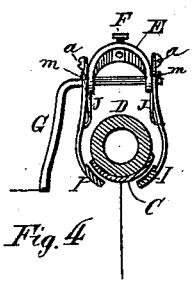
Figure 4:
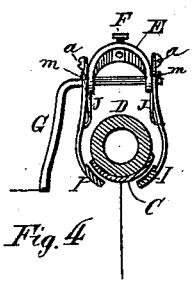

Figure 1 is a side view of the front portion of a bicycle embodying my invention. Fig. 2 is a plan view of the brake detached from the bicycle. Fig. 3 is a front view of the same. Fig. 4 is a similar view showing a section of the wheel.

My invention relates to an improved bicycle-brake which is specially adapted for bicycles, but can be applied also to tricycles and other styles of wheeled vehicles.

As bicycles are now usually constructed the wheels consist of steel spokes secured to a metal or wood rim, on the outside of which is fitted a rubber tube, which as the present method of applying the brake directly on the rubber portion soon destroys it the advantages of my device will be seen at once, as my brake presses only on the under side of the metal rim with equal pressure on both sides of the spokes. My brake is also light, but strong and simple in construction, requiring very little pressure to apply it and affording about four inches of brake-surface equally divided on both sides of the spokes, and conveniently operated by a foot-lever. A spring on each side presses the brake-shoes off the rim of the wheel, and pressure on a lever applies the brakes to the under side of the metal rim.

In the drawings, A, Fig. 1, represents the head of the machine; B, the forks; C, the inner rim of the wheel, usually made of thin curved metal or wood; D, the outer or rubber tire, secured to the rim.

E, Fig. 2, represents a semicircular-shaped collar which is secured to the head A a little above the wheel, as shown in Fig. 1, F being a set-screw on the round end of it to hold it firm on the head.

G is a lever for operating the brake, and its spindle portion is round and passes through the two ends of the said collar and also acts as a base to hold the two brake-rods H H, whose inner ends have holes through which the end of the lever G passes and are held by screws *m m*. The ends of the brake-rods H H terminate in rectangular-shaped brake-shoes I I about two and a half inches long and half an inch wide and covered on their upper side with leather, rubber, or equivalent material which will impinge on the rim of the wheel sufficiently firm, but not injure it in any way.

J J are steel-wire springs, each secured at one end by a screw *a* to the collar E and the outer ends fastened to the brake-rods H H by their bending into corresponding holes in the rods, as shown at Fig. 2, or in any other convenient manner, to press down the brake-shoes from the wheel when the brake is not used. Pressure of the rider's foot on the end of the lever G pushes the brake-shoes up against the rim of the wheel and brakes the bicycle.

It will be seen that a foot-rest *c* is usually attached to the forks B in proximity to the brake-lever, so that as the rider on going down-hill removes his feet from the pedals and places them on the foot-rests he can easily apply the brake to the under side of the rim of the wheel by simply lowering the ball of his foot against the end of the operating-lever G with a slight forward pressure. Thus it will be seen that the brakes are easily applied to the under side of the rim of the wheel (or to a plate interposed between the rim and the brake-shoes) by a foot device, without in any way injuring the rim of the wheel and not at all touching the rubber tire, so that all danger of wear to that portion by the use of the brake is entirely avoided.

Having thus described my device and its advantages, what I claim, and desire to secure by Letters Patent, is—

In combination with a bicycle or analogous vehicle a semicircular-shaped collar adjustably secured to the head of the machine, two brake-rods having brake-shoes attached at their lower ends, a foot-lever made to pass through the collar and through the two brake-rods, and two springs attached to said collar having their ends secured to the brake-rods to press them downward and operated by the foot-lever to press them upward for the brake-shoes to press on the under side of the rim of the wheel, when the brake is to be applied, all constructed substantially as and for the purpose specified.

Dated at Paris, Ontario, this 21st day of May, A. D. 1894.

FRANK HAMMOND.

In presence of—
R. O. MARBLINSCO,
J. A. SANDERSON.